US011305232B2

(12) United States Patent
Chen et al.

(10) Patent No.: US 11,305,232 B2
(45) Date of Patent: Apr. 19, 2022

(54) FILTRATION SYSTEMS AND METHODS

(71) Applicant: UltraCell LLC, Livermore, CA (US)

(72) Inventors: Ru Chen, Dublin, CA (US); Franklin Paul Barcinas, Stockton, CA (US); Ian W. Kaye, Livermore, CA (US)

(73) Assignee: ULTRACELL LLC, Livermore, CA (US)

( * ) Notice: Subject to any disclaimer, the term of this patent is extended or adjusted under 35 U.S.C. 154(b) by 76 days.

(21) Appl. No.: 16/892,171

(22) Filed: Jun. 3, 2020

(65) Prior Publication Data

US 2020/0376434 A1 Dec. 3, 2020

Related U.S. Application Data

(60) Provisional application No. 62/972,731, filed on Feb. 11, 2020, provisional application No. 62/957,053, filed on Jan. 3, 2020, provisional application No. 62/889,973, filed on Aug. 21, 2019, provisional application No. 62/856,325, filed on Jun. 3, 2019.

(51) Int. Cl.
| | |
|---|---|
| *B01D 61/02* | (2006.01) |
| *B01D 61/58* | (2006.01) |
| *H01M 8/1011* | (2016.01) |

(52) U.S. Cl.
CPC ......... *B01D 61/025* (2013.01); *B01D 61/027* (2013.01); *B01D 61/58* (2013.01); *H01M 8/1011* (2013.01); *B01D 2311/04* (2013.01)

(58) Field of Classification Search
CPC .. H01M 8/025; H01M 8/0618; B01D 61/025; B01D 61/027
See application file for complete search history.

(56) References Cited

U.S. PATENT DOCUMENTS

| | | | | |
|---|---|---|---|---|
| 4,152,306 | A * | 5/1979 | DeMatteo, Jr. | .......... C11D 3/43 |
| | | | | 106/13 |
| 7,666,539 | B2 | 2/2010 | Brantley et al. | |
| 7,807,129 | B2 | 10/2010 | Kaye | |
| 7,807,313 | B2 | 10/2010 | Kaye et al. | |
| 7,935,452 | B2 | 5/2011 | Kaye | |
| 2005/0112417 | A1* | 5/2005 | Oshima | ................ H01M 8/1011 |
| | | | | 429/410 |
| 2006/0247143 | A1* | 11/2006 | Gallagher | ........... C11D 11/0035 |
| | | | | 510/180 |
| 2006/0269803 | A1* | 11/2006 | Bofinger | ............... H01M 8/1011 |
| | | | | 429/506 |

(Continued)

OTHER PUBLICATIONS

Darvishmanesh, Siavash, et al. "Novel polyphenylsulfone membrane for potential use in solvent nanofiltration." Journal of Membrane Science 379.1-2 (2011): 60-68. (Year: 2011).*

(Continued)

*Primary Examiner* — Bradley R Spies

(74) *Attorney, Agent, or Firm* — Beyer Law Group LLP

(57) ABSTRACT

Filtration systems and methods for purifying windshield washer fluid to yield methanol pure enough for fueling methanol fuel cell systems. Pumping commercially available windshield washer fluid through filtration systems having one or more filters can remove additives from the windshield washer fluid. The filtration systems include filters, such as activated carbon filters, nanofiltration filters, reverse osmosis filters, and ion exchange resin filters.

22 Claims, 12 Drawing Sheets

(56) References Cited

U.S. PATENT DOCUMENTS

| | | | |
|---|---|---|---|
| 2011/0020717 A1* | 1/2011 | Kaye | H01M 8/0612 429/423 |
| 2014/0147758 A1* | 5/2014 | Akiyama | H01M 8/04164 429/410 |
| 2014/0352801 A1* | 12/2014 | McAlister | B60K 15/035 137/312 |

OTHER PUBLICATIONS

GM Windshield Washer Fluid MSDS—ACDelco, revised 2015 (Year: 2015).*
TTWW40 Windshield Cleaner—40F MSDS—KMX Regulatory Services—revised 2016 (Year: 2016).*

* cited by examiner

FILTRATION SYSTEMS AND METHODS

RELATED APPLICATIONS

This application claims the benefit of U.S. Provisional Application No. 62/856,325, filed on Jun. 3, 2019, U.S. Provisional Application No. 62/889,973, filed on Aug. 21, 2019, U.S. Provisional Application No. 62/957,053, filed on Jan. 3, 2020, and U.S. Provisional Application No. 62/972,731, filed on Feb. 11, 2020. Each of the foregoing applications is hereby incorporated by reference herein for all purposes.

GOVERNMENT RIGHTS

This invention was made with Government support under contract W56KGU-18-C-0025 awarded by the United States Army to General Technical Services, LLC, and under subcontract GTS-S-18-271 awarded by General Technical Services, LLC to UltraCell LLC. The Government has certain rights in the invention.

BACKGROUND OF THE INVENTION

The present disclosure generally relates to filtration devices. More specifically, the disclosure relates to filtration devices for purifying windshield washer fluid for providing a cost-efficient and readily available fuel source for portable fuel cells.

Fuel cells using methanol fuel have shown promise for providing portable power, especially for soldiers in the field. The main stumbling block toward wide integration of methanol fuel cell generators has been the availability of methanol. In order for more widespread implementation of methanol fuel cell generators to occur, the form factor should be amenable to integration with the body armor and rucks that are worn by soldiers. The fuel source should also be cost-efficient and easily procured.

Portable reformed methanol fuel cells developed by UltraCell LLC of Livermore, Calif. are fueled by a mixture of methanol in water 50-75 wt %. Windshield washer fluid has a similar composition. Low temperature windshield washer fluid used is roughly 70-80 wt % methanol and MIL-STD windshield washer fluid is also roughly 70 wt % methanol. Safety and shipping personnel are often uncomfortable handling pure methanol. However, such personnel have no issue dealing with windshield washer fluid. It is readily available and can be shipped easily. Therefore, it would be desirable to be able to use windshield washer fluid as a fuel source for portable fuel cells.

SUMMARY OF THE INVENTION

In accordance with an embodiment, a method is provided for purifying windshield washer fluid. Windshield washer fluid comprising methanol and at least one other compound of is provided. The concentration of the methanol is 50 wt % or higher. The windshield washer fluid is passed through a filtration system comprising at least one filter to produce purified windshield washer fluid, wherein the purified windshield washer fluid has evaporation residue less than 1000 ppmW.

In accordance with another embodiment, a method is provided for producing methanol fuel for powering a methanol fuel cell. Windshield washer fluid comprising methanol and at least one other compound is provided. The concentration of the methanol is 50 wt % or higher. The windshield washer fluid is passed through a filtration system comprising at least one filter to produce purified windshield washer fluid, wherein the purified windshield washer fluid has evaporation residue less than 1000 ppmW. The methanol fuel cell is fueled with the purified windshield washer fluid.

In accordance with yet another embodiment, a purified windshield washer fluid is provided. The purified windshield washer fluid has evaporation residue less than 1000 ppmW, and the purified windshield washer fluid is produced by a process. The process begins with providing a windshield washer fluid comprising methanol and at least one other compound, wherein a concentration of the methanol is 50 wt % or higher. Windshield washer fluid is then passed through a filtration system comprising at least one filter. The at least one filter is selected from the group consisting of: an activated carbon filter, a membrane separation filter, and an ion exchange resin filter.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Figure 1:
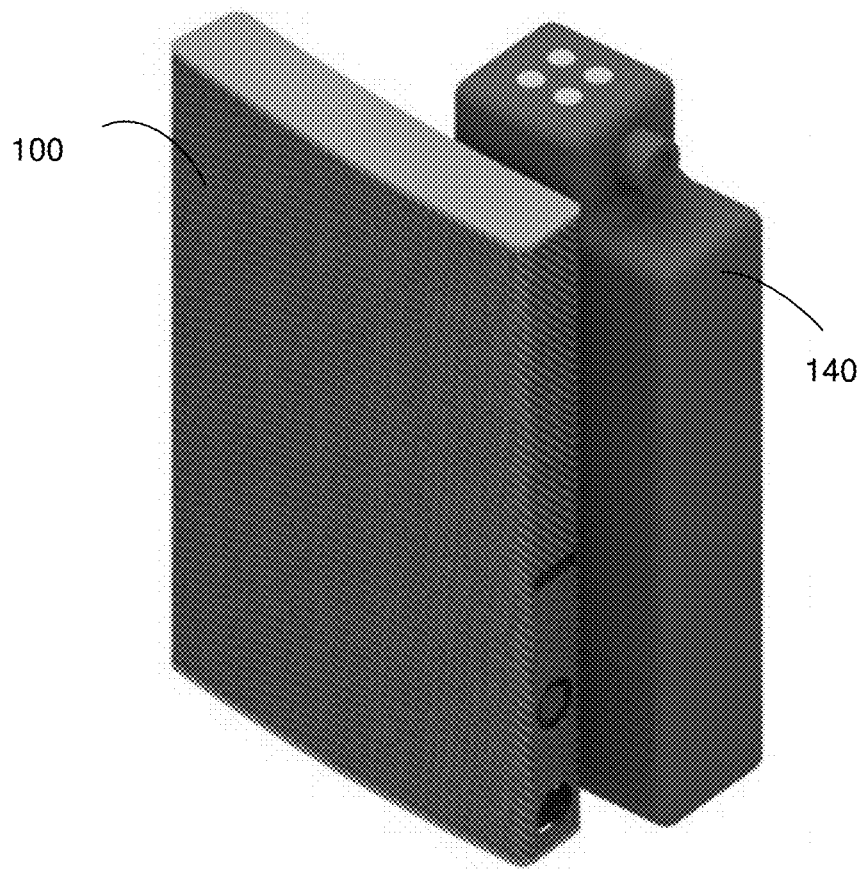
FIG. 1 is a perspective view of a portable fuel cell and battery in accordance with an embodiment.

The present invention relates generally to filtration of windshield washer fluid to yield methanol pure enough to fuel methanol fuel cells, including portable reformed methanol fuel cells. An embodiment of a portable reformed methanol fuel cell system 100 developed by UltraCell LLC is shown in FIG. 1. As shown in FIG. 1, the fuel cell system 100 has conformal packaging, including a fuel bladder and heat pipe thermal management, and also a conformally shaped battery 140.

Figure 2:
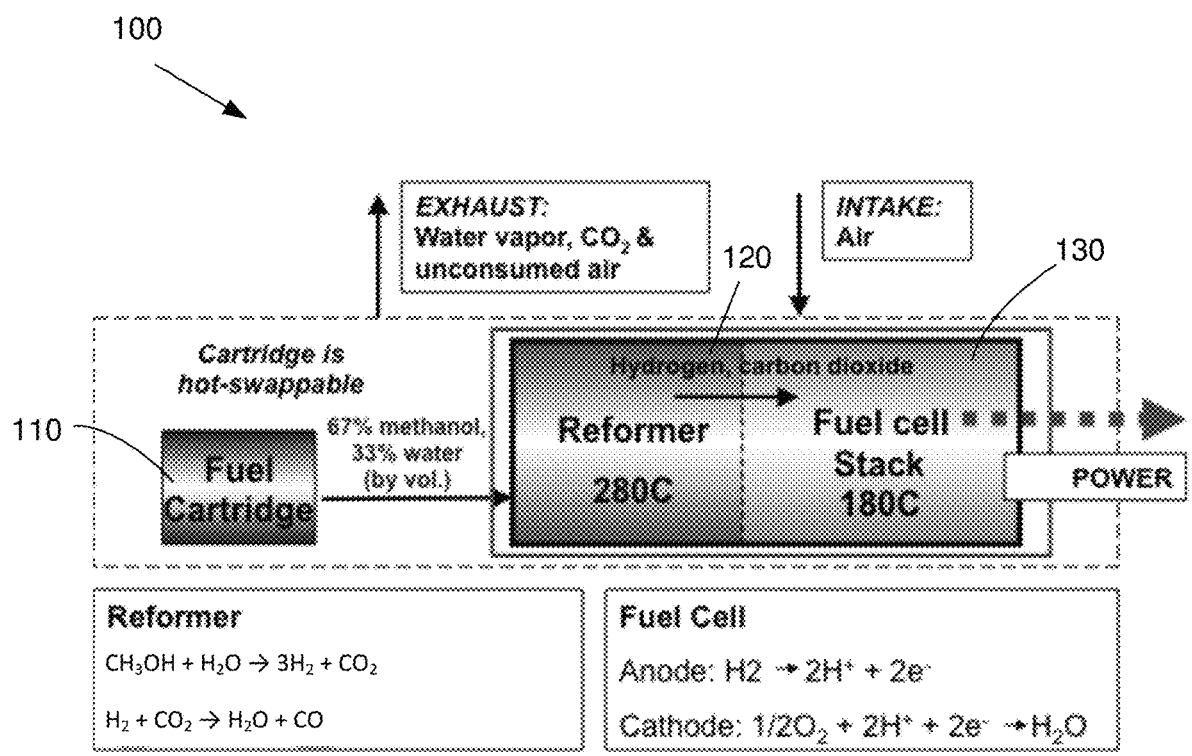
FIG. 2 is a schematic diagram of a portable reformed methanol fuel cell and fuel cartridge in accordance with an embodiment.

FIG. 2 is a schematic diagram showing the operation of a reformed methanol fuel cell system 100. In FIG. 2, the fuel cell system 100 is shown with a fuel cartridge 110. As shown in FIG. 2, fuel from the fuel cartridge 110 is fed into a reformer 120 and the fuel cell stack 130 to produce power.

According to some embodiments, a roughly 1:1.1 molar mixture of methanol ($CH_3OH$) and water ($H_2O$) is fed from the fuel cartridge 110 into the reformer 120 where the mixture is converted into reformate (about 70% hydrogen ($H_2$)). This reformate gas then flows into a high temperature polymer electrolyte (HTPEM) membrane electrode assembly (MEA) of the fuel cell stack 130 that converts ambient air and the $H_2$ into power. About 70-75% of the $H_2$ and 30% of the oxygen ($O_2$) are consumed in the fuel cell and the unused gases are fed into a catalytic reactor that oxidizes all remaining fuel to supply heat to the reformer 120. These unique parameters allow the fuel cell to operate directly on a ⅔ mixture of methanol and water (without the need for water recovery) enabling the fuel cell to operate between −20° C. to +55° C. According to some embodiments, the fuel cell can operate from −30° C. to +65° C. Thus, the fuel cells described herein can operate with a single fuel mixture in extreme conditions, ranging from cold Arctic conditions to hot desert conditions, and do not require separate streams of fuel and water to operate.

Commercially available and MIL-STD windshield washer fluids typically contain methanol and other compounds, including water as well as small amounts of additives, such as surfactants, colorants (dyes), bitterants (bittering agents) and odorants as well as contaminants. In MIL-STD windshield washer fluid, there is a very low amount of contaminants, down to about 0.005% by mass. The surfactants, colorants, odorants, and bitterants are high molecular weight organic compounds, and they do not evaporate at ambient and fuel processor operating temperatures. The concentration of these compounds can be up to 0.5 wt %.

However, these additives and contaminants can be filtered out from windshield washer fluid using a filtration system including one or more filters to yield methanol that can be used in fuel cells, including portable reformed methanol fuel cells manufactured by UltraCell LLC. A compact filtration system can be used to filter the windshield washer fluid. The methanol used for the fuel cell preferably has evaporation residue that is less than about 1000 ppmW, which is roughly four to five orders of magnitude cleaner than standard MIL-STD windshield washer fluid.

The portable reformed methanol fuel cells developed by UltraCell LLC typically operate at a temperature in a range of about 130-200° C. At these operating temperatures, the fuel cell is not readily susceptible to traditional catalyst poisoning. Furthermore, the fuel cell is downstream of the methanol reformer which comprises CuZnO catalysts, which are a natural trap for stray poisons. However, for the fuel cells described herein, the major failure mode when using methanol containing additives or "dirty methanol" in these fuel cells is boiler fouling. Boiler fouling is when evaporation residues collect in the methanol micro channel evaporator and eventually clog up fluidic passages. Hence, a relatively straightforward filtration system to remove particulate matters and evaporation residues from windshield washer fluid will yield a suitable fuel source for the fuel cell. As long as the methanol concentration is 50 wt % or higher and including neat methanol (0% water added) and evaporation residues are lower than 1000 ppmW, the fuel cell will operate correctly. It will be noted that, as used herein, the concentration of methanol (wt %) the fluid is the ratio of methanol weight/(methanol weight+water weight)*100%.

Since commercial windshield washer fluids are different in compositions, different filtration systems and methods can be utilized to purify different windshield washer fluids and meet the fuel requirement for fuel cells. The filtration systems described herein remove evaporation residues from windshield washer fluid. Windshield wiper fluid, or "dirty" methanol because it contains additives in addition to methanol, is fed into the filtration system to filter out the additives. The filtration systems described herein can remove 90% or more of the additives. In some cases, the filtration systems can remove 95% or more of the additives. In still other cases, the filtration systems can remove 98% of the additives. The removal rate depends not only on the specific filtration system used but also the specific windshield washer fluid.

A particular concentration of MIL-STD windshield washer fluid (e.g., National Stock Number (NSN) 6850-00-926-2275 Cleaning Compound, Windshield) is as follows: about 69% methanol, about 0.4% nonionic surfactant, about 1.4% ethylene glycol, and less than 0.002% green dye, and water. As the boiling point of ethylene glycol is 197° C. and it is miscible in water, all of the ethylene glycol would be vaporized, as the reformer 120 operating temperature is around 280° C. Once in the reformate stream, there would be very little or no condensation, even in the fuel cell which operates at 160° C., due to a very low partial pressure of the material. The ethylene glycol would most likely pass through the reformer and fuel cell stack as a vapor, and would not clog the boiler.

As noted above, one type of filter used in the filtration systems described herein is an activated carbon filter. The adsorbent used in an activated carbon filter is mainly activated carbon, which can include both granular and powdered activated carbon. A carbon block can be formed by extruding or compression molding of powdered activated carbon and polymer binders. It has been demonstrated that sulfur and chloride, which are contaminants in some windshield washer fluids, can poison reformer catalysts. The different filters can be used to remove sulfur and chloride compounds.

Ion exchange resin filters and other adsorbents, such as polymeric adsorbents (polystyrenes, polymethacrylates, etc.), alumina, and silica may also be used to remove additives in commercial windshield washer fluids. The adsorption can be carried out in batch reactors or columns. Depending on the adsorbents and filtration operating conditions, the filter can be axial flow, radial flow, or both.

Membrane separation processes can also be used for purification of windshield washer fluids. Pressure-driven membrane separation processes include microfiltration, ultrafiltration, nanofiltration, and reverse osmosis. Membrane separation processes are simple to set up and operate and the energy consumption of such processes is relatively low. Nanofiltration and reverse osmosis filters, in particular, are very effective in removing additives from windshield washer fluids.

Nanofiltration and reverse osmosis filters can be used to remove additives from windshield washer fluids, with a removal rate over 90%. As discussed in more detail below, activated carbon and ion exchange resin filters can be used with membrane separation processes to improve production quality and yield of methanol/water mixture.

Figure 3:
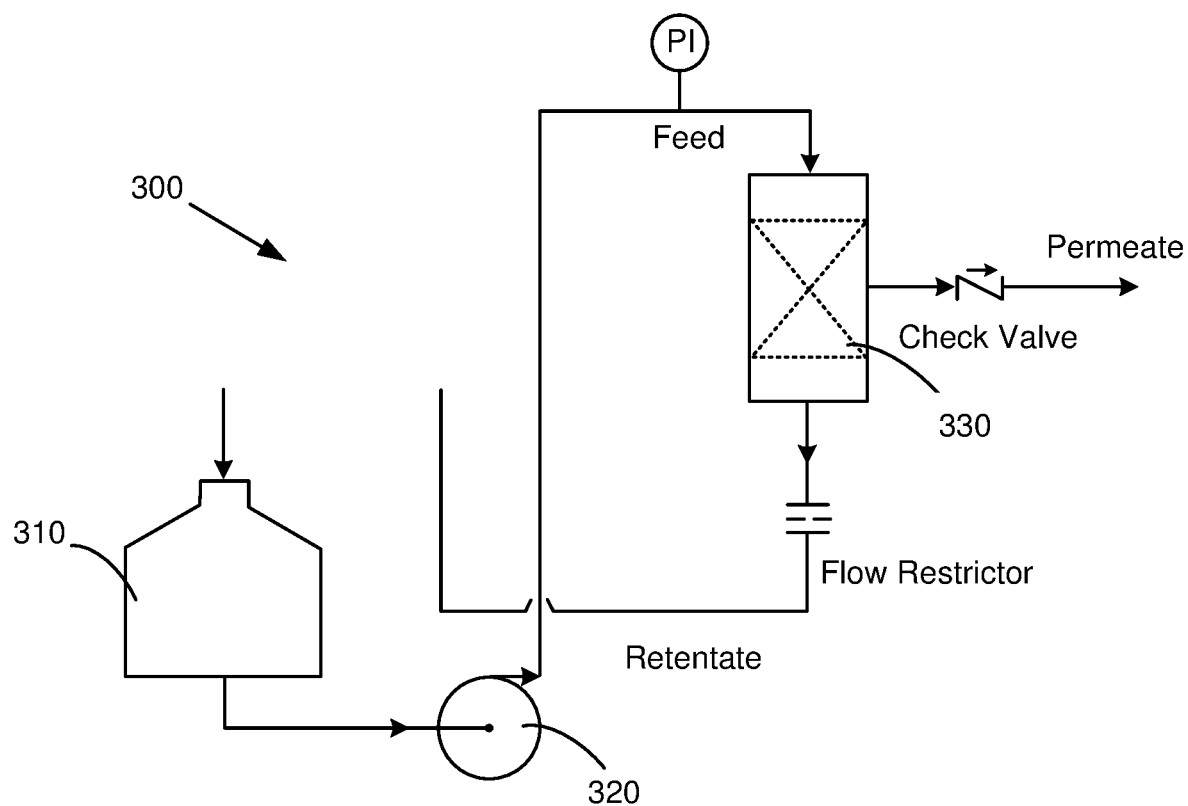
FIG. 3 is a schematic diagram of a filtration system according to an embodiment.

According to an embodiment, a filtration system 300 for windshield washer fluids is shown in FIG. 3. As shown in FIG. 3, the filtration system 300 includes a reservoir 310, a pump 320, and a filter 330. Windshield washer fluid is provided in the reservoir 310. A pump 320 is used to pump the fluid through the filtration system 300. The fluid is pumped from the reservoir 310 and through a filter 330 to purify the fluid. The filter 300 can be any one of the following: a nanofiltration filter, an activated carbon filter, a reverse osmosis filter, and an ion exchange resin filter.

Purified windshield washer fluid (filtered permeate) exits the filter 330. As shown in FIG. 3, retentate is circulated from the filter 330 back to the reservoir 310 for further filtering. In a particular embodiment in which the filter 330 is a nanofiltration filter, the inlet pressure of the nanofiltration filter 330 is 16-17 psig.

In some embodiments, multi-stage filtration can be used to purify commercial windshield washer fluids. The multi-stage filtration systems described herein can purify windshield washer fluids. These multi-stage filtration systems, which can include more than one of activated carbon, reverse osmosis (RO), nanofiltration, and ion exchange resin filters, can effectively remove impurities and additives from windshield washer fluids to yield methanol that can be used in methanol fuel cells. Using multiple filters in a filtration system can further improve the filtration.

Figure 4:
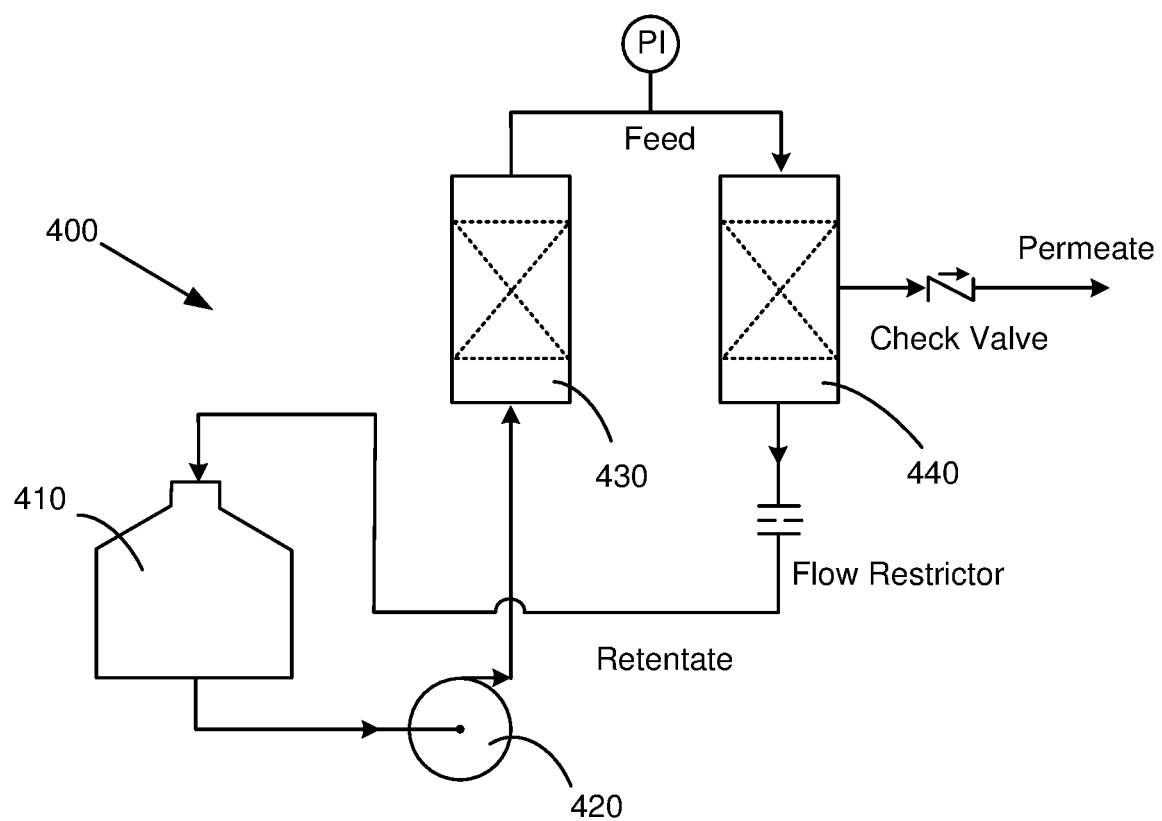
FIG. 4 is a schematic diagram of a two-stage filtration system according to an embodiment.

According to an embodiment shown in FIG. 4, a two-stage filtration system 400 is used for purifying windshield washer fluids. The windshield washer fluid is provided in a reservoir 410. A pump 420 is used to circulate the fluid through the filtration system 400. The fluid is pumped from the reservoir 410 to an activated carbon filter 430. After passing through the activated carbon filter 430, the fluid then flows through a membrane separation process filter 440. According to an embodiment, the membrane separation process filter 440 is a reverse osmosis filter. In this embodiment, the inlet pressure of the reverse osmosis filter 440 is 16-17 psig. Retentate flows from the membrane separation filter 440 back to the reservoir 410 for further purification. The permeate exits the membrane separation filter 440 as purified windshield washer fluid. According to another embodiment, the membrane separation filter 440 is a nanofiltration filter.

In other embodiments, such as a four-stage filtration system 600 and five-stage filtration systems 800, 900 for example, one or more activated carbon and ion exchanging resin filters are positioned in the filtration system 400 after the membrane separation process filter 440 to further purify the resulting methanol/water mixture.

Experiments were conducted purifying windshield washer fluids manufactured by Camco using the filtration systems 300, 400. To measure the evaporation residue of the windshield washer fluid, the fluid was placed in a glass beaker and weighed. Methanol and water in the sample were allowed to evaporate in a fume hood. The residue in the beaker was dissolved in a small amount of deionized water and transferred into a small glass vial. The residue was then dried in a convection oven at 110° C. The weight of the residue was measured with a high precision balance, and the concentration of evaporation residue was calculated.

The evaporation residue in the Camco windshield washer fluids was calculated at 4,578 ppmW. The test results showed that over 90% of evaporation residues were removed by nanofiltration and reverse osmosis (Table 1). The activated carbon filter 430 in the reverse osmosis filtration system 400 continuously removed additives from the retentate stream. The flow rate of the permeate of the reverse osmosis filtration system 400 was therefore substantially constant during the experiment. As comparison, the permeate flow rate of the nanofiltration system 300 gradually decreased as the additives continued to accumulate in the retentate.

TABLE 1

|  | Permate Conc. (ppmW) | Retentate Conc. (ppmW) | Removal (%) |
| --- | --- | --- | --- |
| Nanofiltration | 281 | 20,914 | 94 |
| Reverse Osmosis | 348 | 2,623 | 92 |

Figure 5:
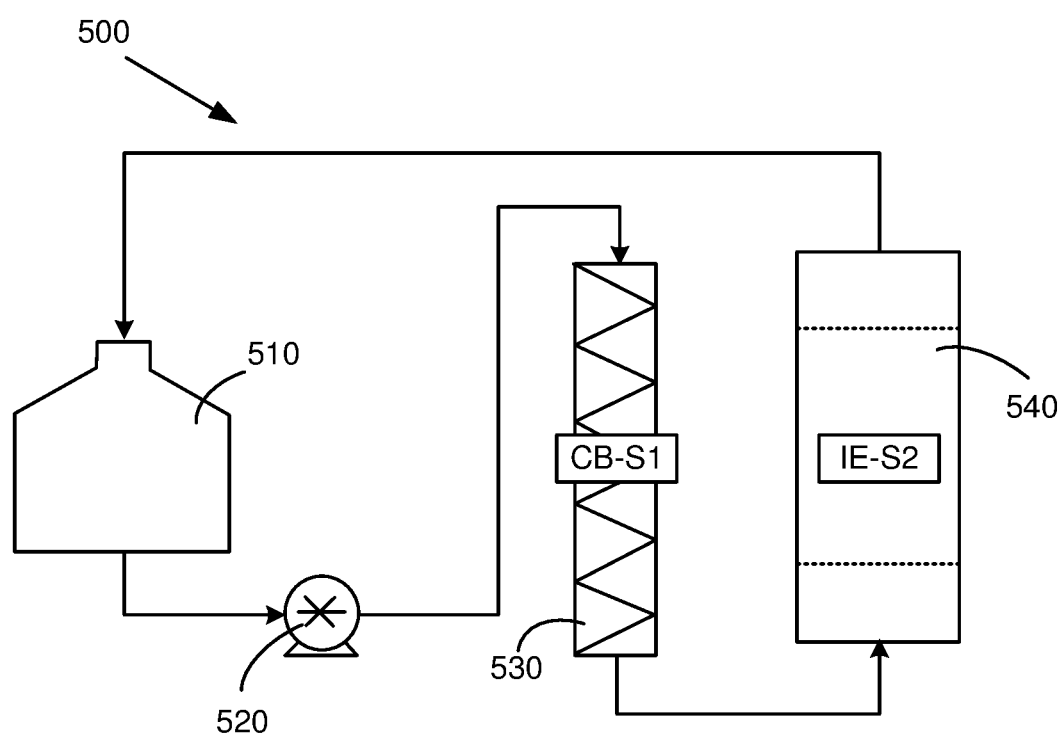
FIG. 5 is a schematic diagram of a two-stage filtration system according to another embodiment.

FIG. 5 shows another embodiment of a two-stage filtration system 500 for purifying windshield washer fluid. In this embodiment, the windshield washer fluid is provided in a reservoir 510. The windshield washer fluid is circulated by a pump 520 through the filtration system 500. The fluid is pumped from the reservoir 510 to an activated carbon filter 530. After the fluid passes through the activated carbon filter 530, it then flows through an ion-exchange resin filter 540. As shown in FIG. 5, the fluid is then circulated back to the reservoir 510.

According to an embodiment, the activated carbon filter 530 is replaced after every 2.6 gallons of fluid flowed therethrough. It will be understood that the frequency of filter replacement depends on the size of the filter as well as the composition of the fluid that is being purified. According to a particular embodiment, the fluid is circulated through the two-stage filtration system 500 for two hours. It will be understood that the amount of circulation time depends on the quantity of fluid that is being purified.

Windshield washer fluids manufactured by Rite-Kem and Camco, for example, contain about 58-64 wt % methanol. Rite-Kem windshield washer fluids can be purified by a two-stage filtration system that consists of an activated carbon filter and an ion exchange resin filter. Camco windshield washer fluids can be purified by a four-stage filtration system that consists of an activated carbon filter, a reverse osmosis filter, an ion-exchange resin filter, and an activated carbon filter. It will be understood that the order of the stage 3 and stage 4 filters (ion exchange resin and second activated carbon filters) in the four-stage filtration system should not affect the performance of the filtration.

In one experiment conducted using the two-stage filtration system 500, Rite-Kem windshield washer fluid was purified by the two-stage filtration system 500 and the fluid was circulated through the system 500 for two hours. The purified windshield washer fluid was removed from the reservoir 510 for evaporation residue measurement and chemical composition analysis.

Prior to filtration, the evaporation residue in the Rite-Kem windshield washer fluid was 4,500 ppmW. After the two-stage filtration, the residue was reduced to 4-7 ppmW. Gas chromatography and gas chromatography/mass spectrometry analysis showed that there was 1.3 wt % 2-butoxyethanol additive in the Rite-Kem windshield washer fluid. This additive can be partially removed using reverse osmosis (single pass-through) and activated carbon (circulated) adsorption with 25% and 83% removal, respectively. In an embodiment, after two-stage filtration, the purified windshield washer fluid contained 0.31 wt % 2-butoxyethanol. In another embodiment, after two-stage filtration, the purified windshield washer fluid contained 0.26 wt % 2-butoxyethanol. The filtration system can be operated in either single-pass or circulation mode.

Figure 6:
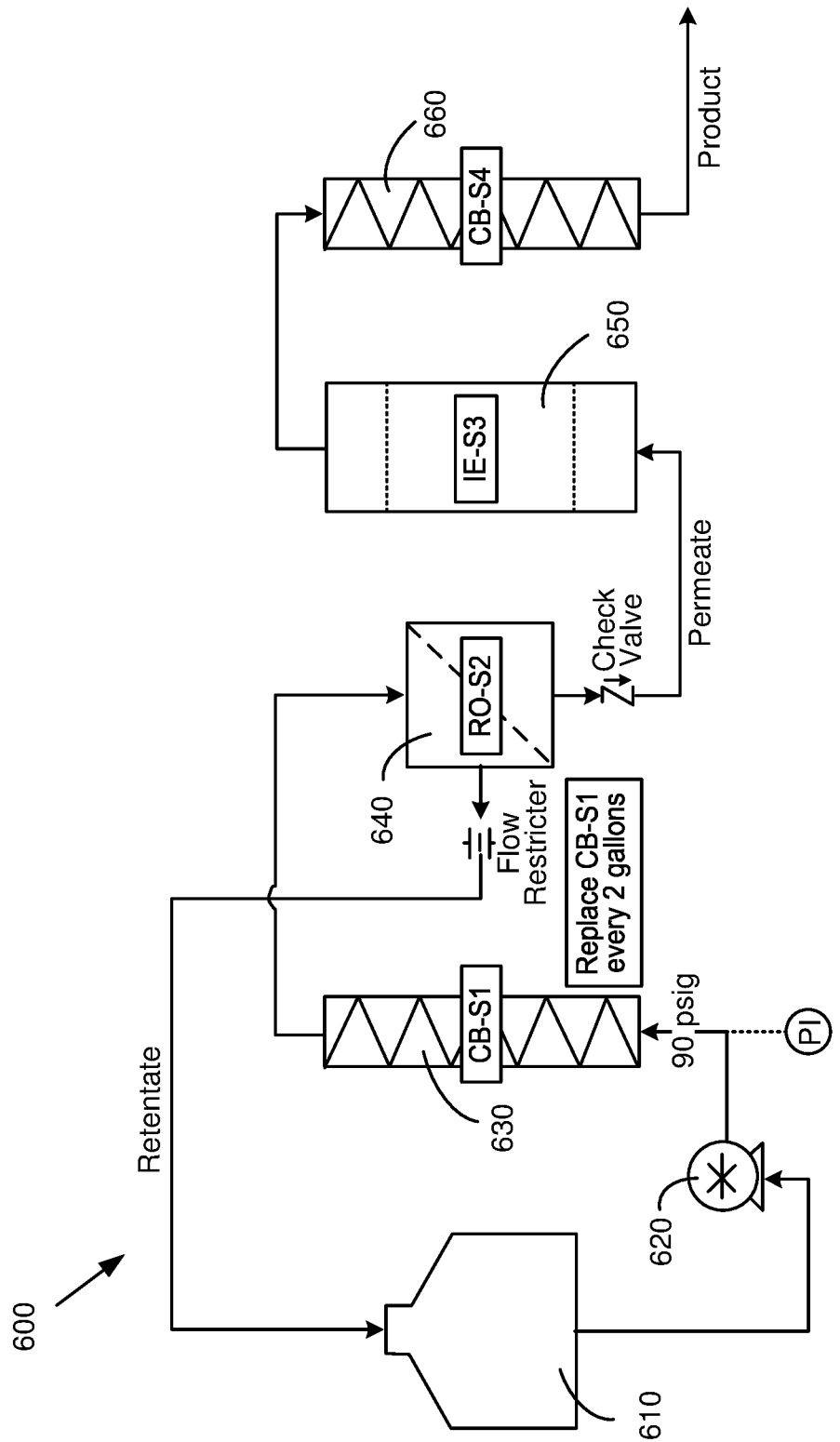
FIG. 6 is a schematic diagram of a four-stage filtration system according to an embodiment.

A four-stage filtration system 600 for purifying windshield washer fluid is shown in FIG. 6. In this embodiment, the windshield washer fluid is provided in a reservoir 610. The windshield washer fluid is circulated through the filtration system 600 by a pump 620. The fluid is pumped from the reservoir 610 to an activated carbon filter 630. After the fluid flows through the activated carbon filter 630, it then flows through a membrane separation filter 440, such as a reverse osmosis filter or a nanofiltration filter. After passing through the membrane separation filter 640, the retentate is then circulated back to the reservoir 610. As shown in FIG. 6, the permeate flows from the membrane separation filter 640 and through an ion exchange resin filter 650, and subsequently through a second activated carbon filter 660 for further purification. Purified windshield washer fluid flows out of the second activated carbon filter 660.

Figure 7A:
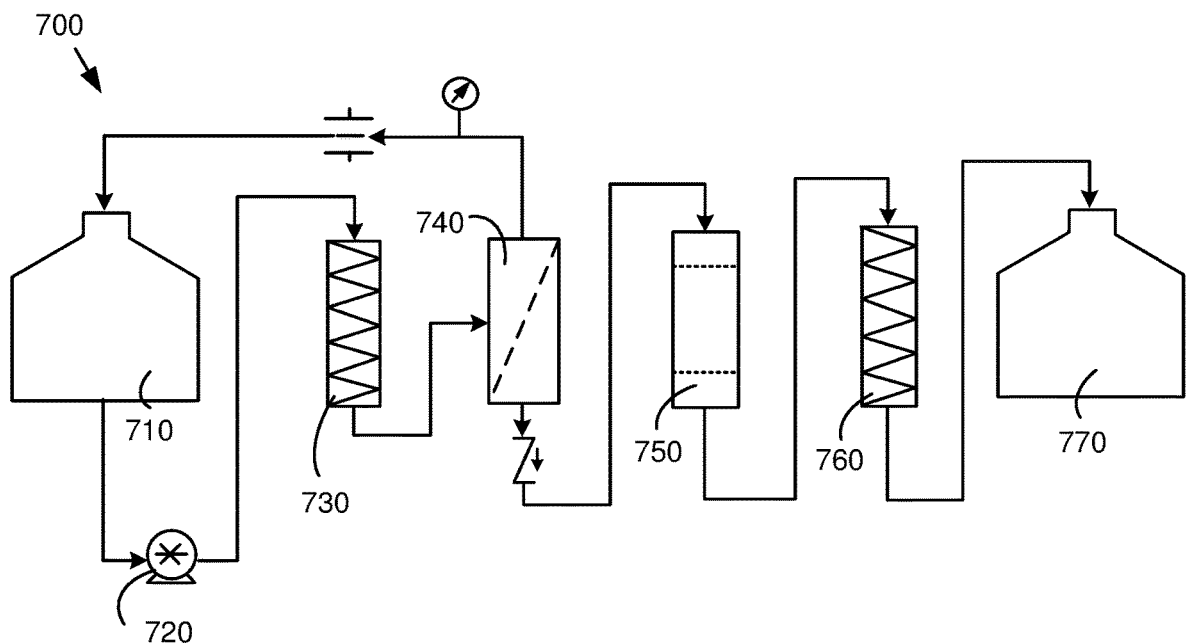
FIGS. 7A and 7B are schematic diagrams showing a four-stage filtration system with external reverse osmosis filtration according to an embodiment.
Figure 7B:
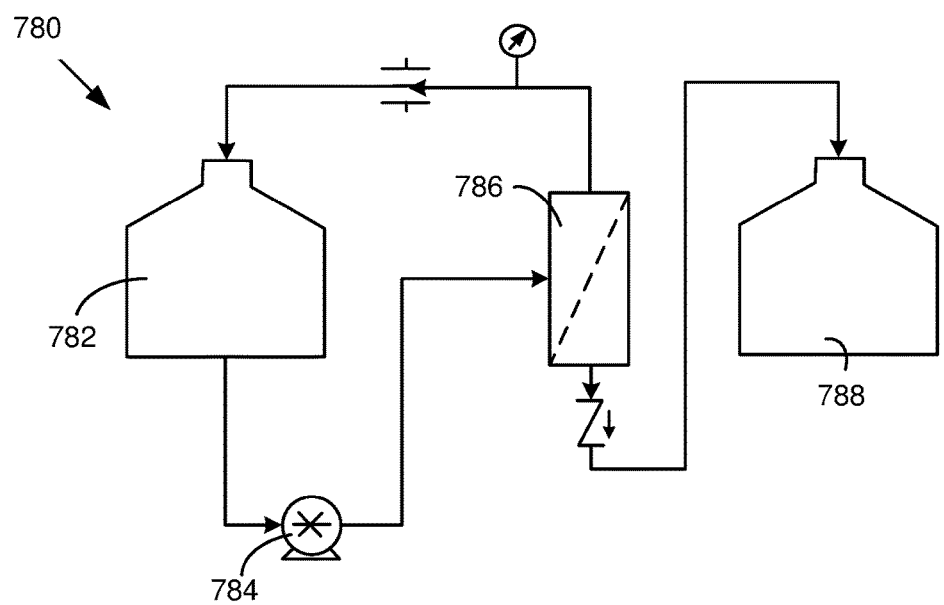

According to another embodiment, as shown in FIGS. 7A and 7B, the purified fluid from the four-stage filtration system is further purified using an external reverse osmosis filter. As shown in FIG. 7A, in this embodiment, the windshield washer fluid is provided in a tank 710. The windshield washer fluid is circulated through the filtration system 700 by a pump 720. The fluid is pumped from the tank 710 to an activated carbon filter 730. After the fluid flows through the activated carbon filter 730, it then flows through a membrane separation filter 740, such as a reverse osmosis filter or a nanofiltration filter. After passing through the membrane separation filter 740, the retentate is then circulated back to the tank 710. As shown in FIG. 7A, the permeate flows from the membrane separation filter 740 and through an ion exchange resin filter 750, and subsequently through a second activated carbon filter 760 for further purification. Purified windshield washer fluid flows out of the second activated carbon filter 760 and into a collection tank 770. The four-stage filtration system 700 is capable of reducing evaporation residue of windshield washer fluid from over 4000 ppmW to less than 100 ppmW.

FIG. 7B shows an external reverse osmosis filtration system 780 for further purification of the fluid purified by the four-stage filtration system 700 shown in FIG. 7A. The purified fluid from the collection tank 770 is provided in another tank 782 and pumped by a pump 784 through a reverse osmosis filter 786 to further purify the fluid. The purified fluid is collected in another tank 788. The evaporation residue of windshield washer fluid can be reduced from over 4000 ppmW to less than 10 ppmW with the additional reverse osmosis filter 786.

In an experiment, windshield washer fluid manufactured by Camco was purified by the four-stage filtration system 700 in which the membrane separation filter 740 was a reverse osmosis filter. The purified windshield washer fluid in the collection tank 770 was then collected using a clean container. Some samples were taken from the container for evaporation residue measurement and chemical composition analysis.

To measure the evaporation residue, the Camco windshield washer fluid was first placed in a glass beaker and weighed. Methanol and water in the sample were allowed to evaporate in a fume hood. The residue in the beaker was dissolved in a small amount of deionized water and transferred into a small glass vial. The residue was then dried in a convection oven at 110° C. The weight of the residue was measured with a high precision balance, and the concentration of evaporation residue was calculated. The composition of windshield washer fluids was analyzed using gas chromatography.

The evaporation residue in Camco windshield washer fluid was 4,800 ppmW. After the four-stage filtration, the evaporation residue was reduced to 34-108 ppmW (Table 2). Gas chromatography and gas chromatography/mass spectrometry did not detect any additive in the windshield washer fluid. The resulting windshield washer fluid was further purified using a reverse osmosis filter. The final windshield washer fluid contained 1.5-3.2 ppmW evaporation residue. Thus, as noted above, an additional reverse osmosis filter 786 can be integrated with the four-stage filtration system 700 to produce windshield washer fluids with very low evaporation residue. The purified Camco windshield washer fluid was evaluated in an UltraCell XX55 fuel cell system, which produced 30 W net power. The performance of the UltraCell XX55 fuel cell system remained stable for at least 160 hours of continuous operation.

TABLE 2

| Filtration Process | Residue Amount (ppmW) | Average Residue (ppmw) |
|---|---|---|
| 4-Stage Filtration | 34.4-107.5 | 77.2 |
| 4-Stage Filtration + RO | 1.45-3.2 | 2.4 |

Figure 8:
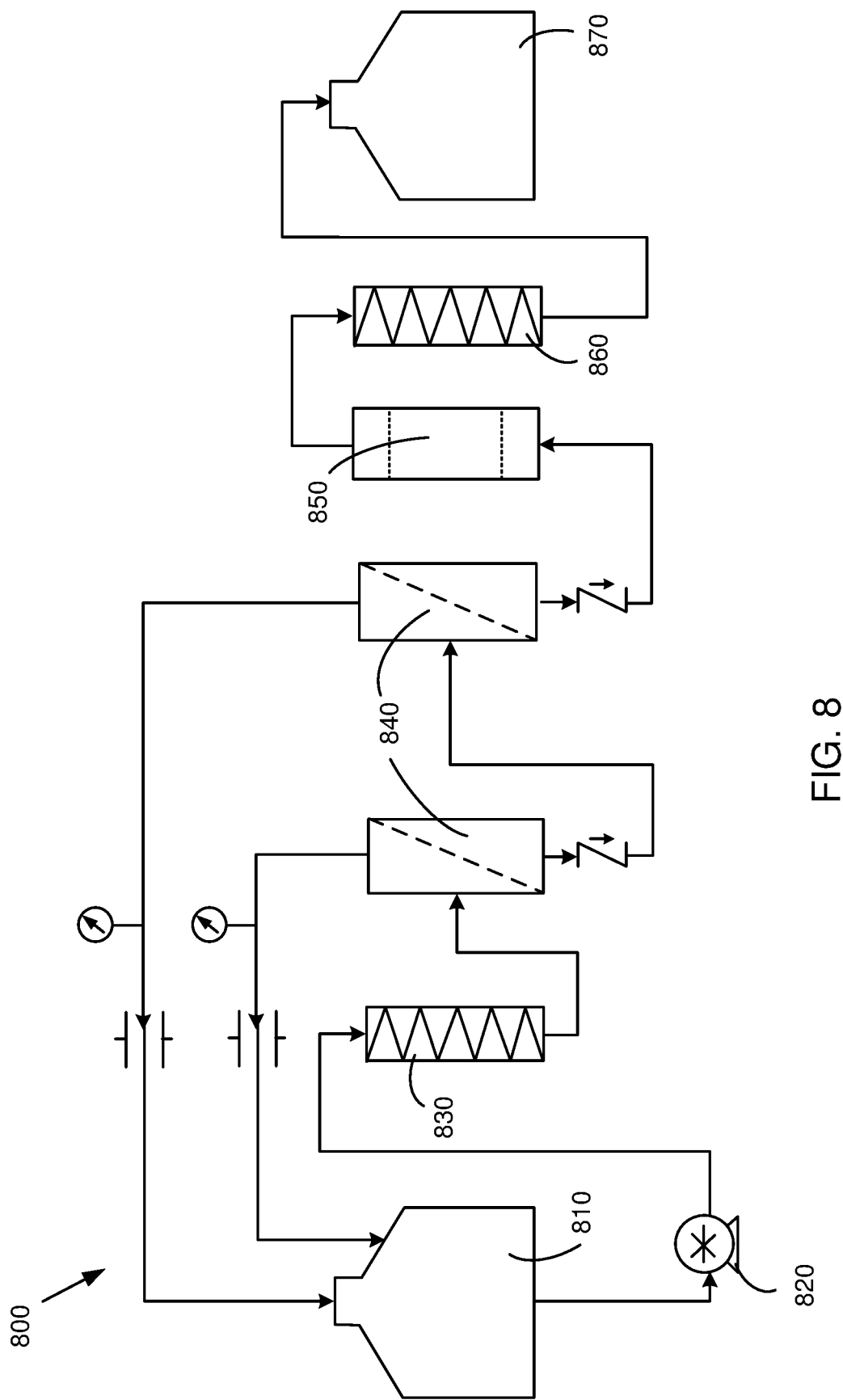
FIG. 8 is a schematic diagram of a one-step five-stage filtration system containing two reverse osmosis filters connected in series in accordance with an embodiment.

As shown in FIG. 8, an embodiment of a one-step five-stage filtration system 800 containing two reverse osmosis filters 840 connected in series is used to purify windshield washer fluid. As shown in FIG. 8, windshield washer fluid is provided in a tank 810. A pump 820 circulates the fluid through the filtration system 800. The fluid flows from the tank 810 through an activated carbon filter 830. From the activated carbon filter 830, the fluid then flows through two reverse osmosis filters 840 connected in series. After flowing through the reverse osmosis filters 840, the fluid then flows through an ion exchange resin filter 850 before flowing through another activated carbon filter 860. The purified fluid from the activated carbon filter 860 flows into a collection tank 870.

Figure 9:
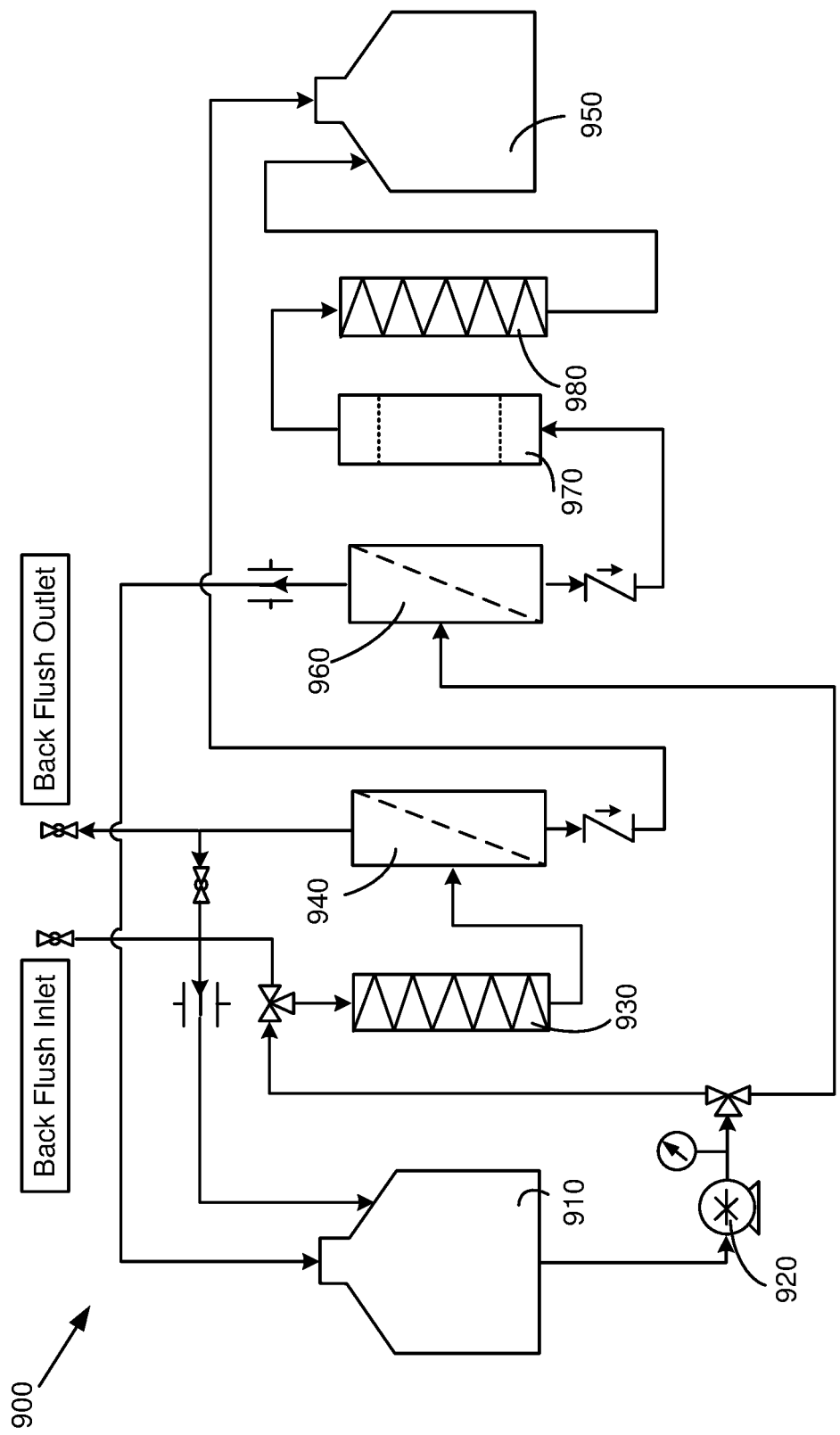
FIG. 9 is a schematic diagram of a two-step five-stage filtration system in accordance with another embodiment.

According to another embodiment shown in FIG. 9, an alternative five-stage filtration system 900 is used to purify windshield washer fluid in two steps in which the first step is a pre-clean step and the second step further purifies the fluid. According to this embodiment, windshield washer fluid is provided in a tank 810 and a pump 920 circulates the fluid through the filtration system 900. In the first step, windshield washer fluid from the tank 910 is pre-cleaned by processing it with an activated carbon filter 930 followed by a reverse osmosis filter 940. In the second step, the windshield washer fluid pre-cleaned from the first step is further purified. The retentate is removed from the tank 910, and the purified windshield washer fluid collected in the collection tank 950 is then transferred into the first tank 910. As shown in FIG. 9, the windshield washer fluid is further processed with another reverse osmosis filter 960, an ion exchange resin filter 970, and then another activated carbon filter 980 before the final product is collected in the collection tank 950.

It will be understood that reverse osmosis is a pressure driven separation process. That is, the higher the pressure, the better the separation performance in both quality and speed. The method described in connection with the illustrated embodiment shown in FIG. 9 assumes the filters are filters designed for residential use with a maximum pressure of 100 psig. If the fluid flows directly from the first reverse osmosis filter 940 to the second reverse osmosis filter 960, both reverse osmosis filters 940, 960 run at pressures much less than 100 psig, adversely affecting the separation quality and speed. Furthermore, it is difficult to balance the pressures between these two filters.

However, in other embodiments, the fluid does not need to be transferred from the collection tank 950 to tank 910 and can instead flow from the first reverse osmosis filter 940 to the second reverse osmosis filter 960 if industrial filters are used because industrial filters can withstand pressure greater than 100 psig.

According to an embodiment after filtration, the activated carbon filters 930, 980 and reverse osmosis filters 940, 960 are back-flushed with tap water for a certain amount of time to clean the filters. In one embodiment using residential filters, the filters are backflushed for about 20 minutes. According to an embodiment, the first activated carbon filter 930 is back-flushed after filtering three gallons of fluid and is replaced after 12 gallons of fluid. The other four filters 940, 960, 970, 980 are replaced after filtering 30 gallons of fluid. The two tanks 910, 950 are rinsed after every use.

To measure the evaporation residue, the windshield washer fluid was first placed in a glass beaker and weighed. Methanol and water in the sample were allowed to evaporate in a fume hood. The residue in the beaker was dissolved in a small amount of deionized water and transferred into a small glass vial. The residue was then dried in a convection oven at 110° C. The weight of the residue was measured with a high precision balance, and the concentration of evaporation residue was calculated. The composition of windshield washer fluids was analyzed using gas chromatography.

Figure 10:
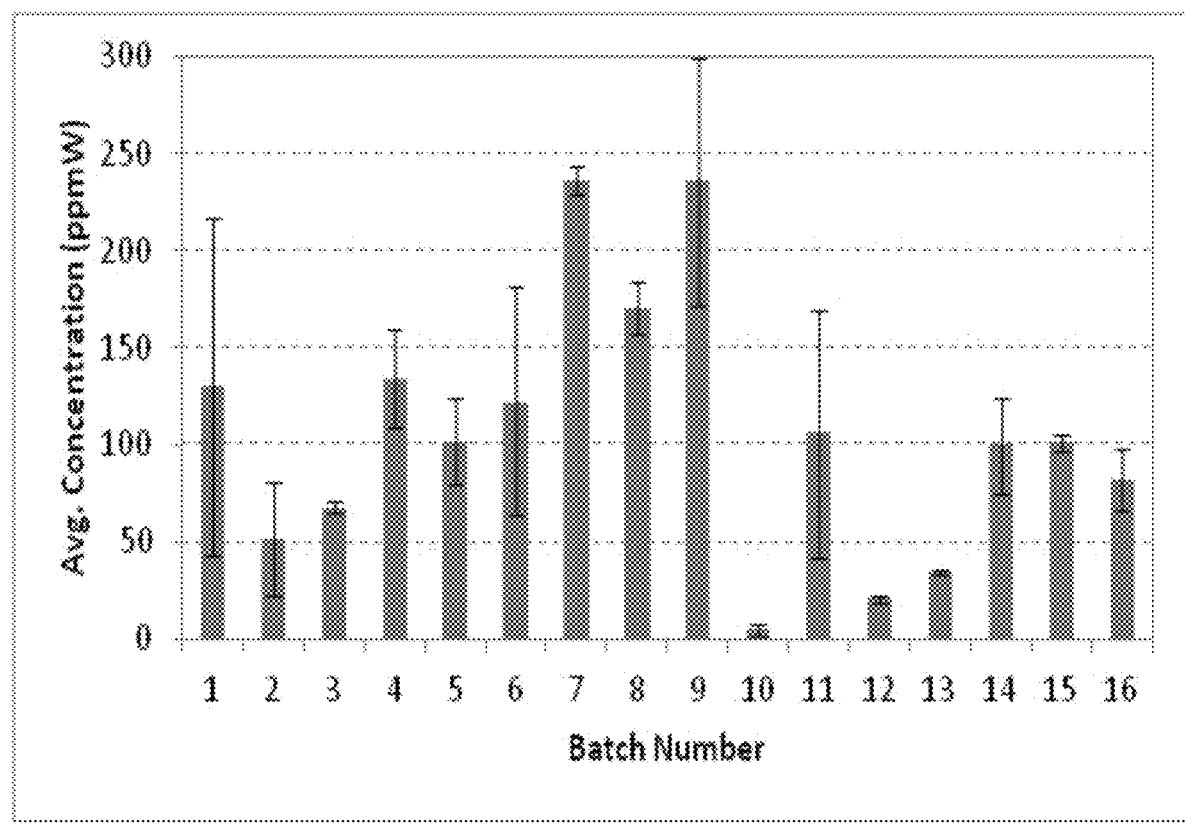
FIGS. 10-12 show concentrations of evaporation residues of clean windshield washer fluids produced by four and five-stage filtrations.
Figure 11:
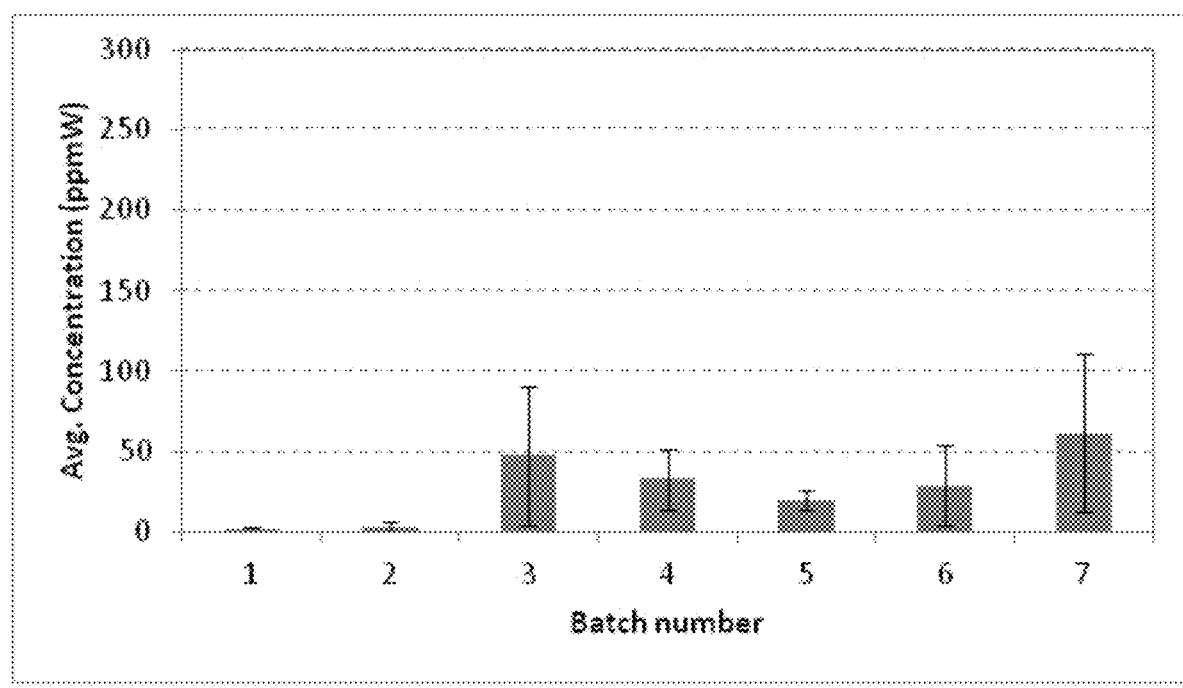
Figure 12:
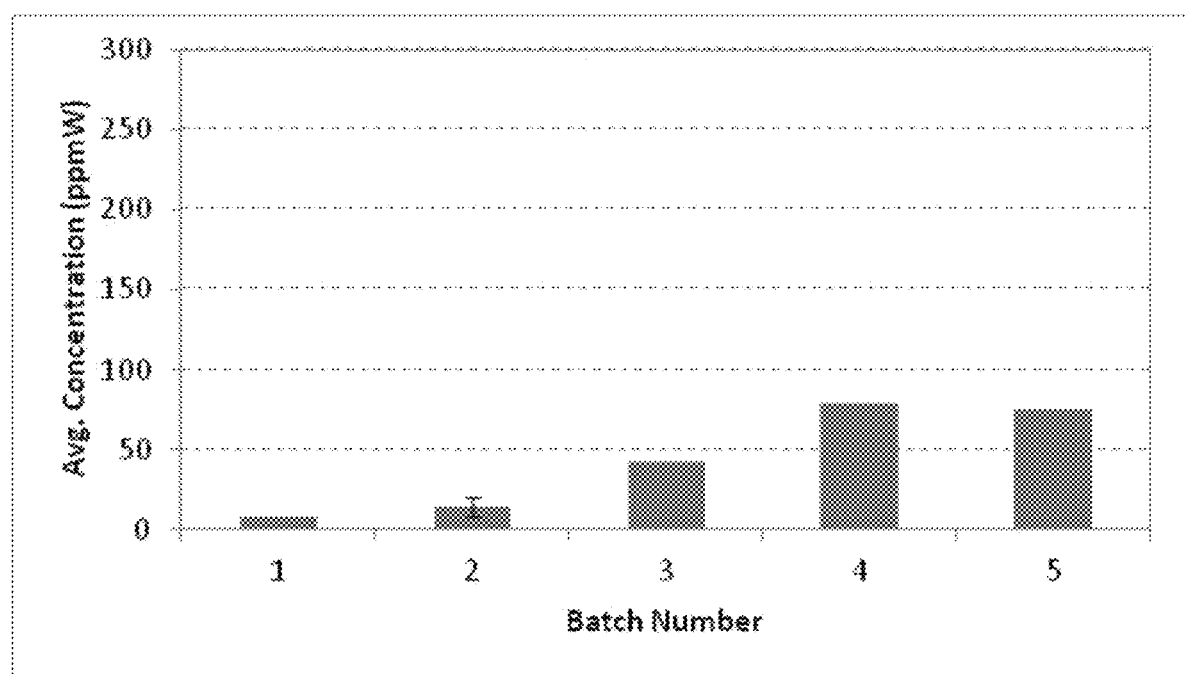

The concentrations of evaporation residues of clean windshield washer fluids produced by four and five-stage filtrations are shown in FIG. 10, FIG. 11, and FIG. 12. In general, filtration with an additional reverse osmosis filter produced cleaner products. The amount of a solute adsorbed on activated carbon particles is dependent on the concentration of a solution. Typically, the absorbance increases as the concentration increases. If used activated carbon is in contact with low concentration solutions such as water, desorption of the solute that adsorbs at higher concentrations will occur. Back-flushing not only purges the filter of residue solution, but also removes solute from the surface of activated carbon particles. Back-flushing regenerates activated carbon filters so that they can be reused.

Although only a few embodiments of the invention have been described in detail, it should be appreciated that the invention may be implemented in many other forms without departing from the spirit or scope of the invention. It will be understood that filtration systems for purifying windshield washer fluid comprise at least one type of the following filters: activated carbon filter, membrane separation filter (e.g., reverse osmosis filter or nanofiltration filter), and ion exchange resin filter.

Multi-stage filtration systems for purifying windshield washer fluid preferably include at least one activated carbon filter. Most embodiments of multi-stage filtration systems include at least one activated carbon filter in combination with a membrane separation filter, such as a reverse osmosis filter. Two-stage filtration systems can include an activated carbon filter in combination with a membrane separation filter or an ion exchange resin filter. Three-stage filtration systems can include an activated carbon filter in combination with: (1) membrane separation filters in series, (2) a membrane separation filter followed by another activated carbon filter, (3) a membrane separation filter followed by an ion exchange resin filter, or (4) an ion exchange resin filter followed by a membrane separation filter. Four-stage and five-stage filtration systems include different combinations of activated carbon filters, membrane separation filters (e.g., reverse osmosis or nanofiltration filters), and ion exchange resin filters. In embodiments that include two membrane separation filters, the filtration can operate in two steps with a pre-clean step followed by a step for further purification of the fluid.

In view of all of the foregoing, it should be apparent that the present embodiments are illustrative and not restrictive and the invention is not limited to the details given herein, but may be modified within the scope and equivalents of the appended claims.

What is claimed is:

1. A purified windshield washer fluid having evaporation residue less than 1000 ppmW, wherein the purified windshield washer fluid is produced by a process comprising the steps of:
   providing a windshield washer fluid comprising methanol and at least one other compound, wherein a concentration of the methanol is 50 wt % or higher; and
   passing the windshield washer fluid through a filtration system comprising at least one filter, wherein the at least one filter is selected from the group consisting of: an activated carbon filter, a membrane separation filter, and an ion exchange resin filter, wherein the windshield washer fluid contains 1.3 wt % 2-butoxyethanol and the purified windshield washer fluid contains 0.31 wt % 2-butoxyethanol.

2. A purified windshield washer fluid having evaporation residue less than 1000 ppmW, wherein the purified windshield washer fluid is produced by a process comprising the steps of:
   providing a windshield washer fluid comprising methanol and at least one other compound, wherein a concentration of the methanol is 50 wt % or higher; and
   Passing the windshield washer fluid through a filtration system comprising at least one filter, wherein the at least one filter is selected from the group consisting of: an activated carbon filter, a membrane separation filter, and an ion exchange resin filter, wherein the windshield washer fluid contains 1.3 wt % 2-butoxyethanol and the purified windshield washer fluid contains 0.26 wt % 2-butoxyethanol.

3. A purified windshield washer fluid having evaporation residue less than 1000 ppmW, wherein the purified windshield washer fluid is produced by a process comprising the steps of:
   providing a windshield washer fluid comprising methanol and at least one other compound, wherein a concentration of the methanol is 50 wt % or higher; and
   passing the windshield washer fluid through a filtration system comprising at least one filter, wherein the at least one filter is selected from the group consisting of: an activated carbon filter, a membrane separation filter, and an ion exchange resin filter, wherein the windshield washer fluid contains 1.3 wt % 2-butoxyethanol and the purified windshield washer fluid contains 0.26 wt %-0.31 wt % 2-butoxyethanol.

4. A purified windshield washer fluid having evaporation residue less than 1000 ppmW, wherein the purified windshield washer fluid is produced by a process comprising the steps of:
   providing a windshield washer fluid comprising methanol and at least one other compound, wherein a concentration of the methanol is 50 wt % or higher; and
   passing the windshield washer fluid through a filtration system comprising at least one filter, wherein the at least one filter is selected from the group consisting of: an activated carbon filter, a membrane separation filter, and an ion exchange resin filter, wherein the windshield washer fluid contains 2-butoxyethanol and a mass fraction of the 2-butoxyethanol in the purified windshield washer fluid contains about 20%-23.8% of a mass fraction of 2-butoxyethanol in the windshield washer fluid before passing the windshield washer fluid through the filtration system.

5. The purified windshield washer fluid as recited in claim 3, wherein the at least one filter is an activated carbon filter and the filtration system further comprises a membrane separation filter.

6. The purified windshield washer fluid as recited in claim 5, wherein the membrane separation filter is a nanofiltration filter.

7. The purified windshield washer fluid as recited in claim 5, wherein the membrane separation filter is a reverse osmosis filter.

8. The purified windshield washer fluid as recited in claim 5, wherein the filtration system further comprises an ion exchange resin filter.

9. The purified windshield washer fluid as recited in claim 8, wherein the filtration system comprises two membrane separation filters in series.

10. The purified windshield washer fluid as recited in claim 3, wherein the purified windshield washer fluid has evaporation residue less than 500 ppmW.

11. The purified windshield washer fluid as recited in claim 3, wherein the purified windshield washer fluid has evaporation residue less than 100 ppmW.

12. The purified windshield washer fluid as recited in claim 3, wherein the purified windshield washer fluid has evaporation residue less than 10 ppmW.

13. The purified windshield washer fluid as recited in claim 3, wherein evaporation residue of the windshield washer fluid is reduced from over 4,000 ppmW to less than 10 ppmW after passing through the filtration system.

14. The purified windshield washer fluid as recited in claim 2, wherein the at least one filter comprises an activated carbon filter and a membrane separation filter.

15. The purified windshield washer fluid as recited in claim 4, wherein evaporation residue of the windshield washer fluid is over 4,000 ppmW and evaporation residue of the purified windshield washer fluid is less than 10 ppmW.

16. The purified windshield washer fluid as recited in claim 1, wherein the at least one filter comprises an activated carbon filter and a membrane separation filter.

17. The purified windshield washer fluid as recited in claim 4, wherein the windshield washer fluid contains 1.3 wt % 2-butoxyethanol and the purified windshield washer fluid contains 0.26 wt %.

18. The purified windshield washer fluid as recited in claim 4, wherein the windshield washer fluid contains 1.3 wt % 2-butoxyethanol and the purified windshield washer fluid contains 0.31 wt %.

19. The purified windshield washer fluid as recited in claim 4, wherein the at least one filter is an activated carbon filter and the filtration system further comprises a reverse osmosis filter.

20. The purified windshield washer fluid as recited in claim 4, wherein the purified windshield washer fluid has evaporation residue less than 500 ppmW.

21. The purified windshield washer fluid as recited in claim 4, wherein the purified windshield washer fluid has evaporation residue less than 100 ppmW.

22. The purified windshield washer fluid as recited in claim 4, wherein the purified windshield washer fluid has evaporation residue less than 10 ppmW.

* * * * *